April 7, 1942.  J. C. BIRCHALL  2,279,273
SEPERATOR FOR BOTTLED MILK AND CREAM
Filed April 8, 1939  3 Sheets-Sheet 1

INVENTOR.
Joseph C. Birchall
BY
ATTORNEY.

April 7, 1942. J. C. BIRCHALL 2,279,273
SEPERATOR FOR BOTTLED MILK AND CREAM
Filed April 8, 1939 3 Sheets-Sheet 2
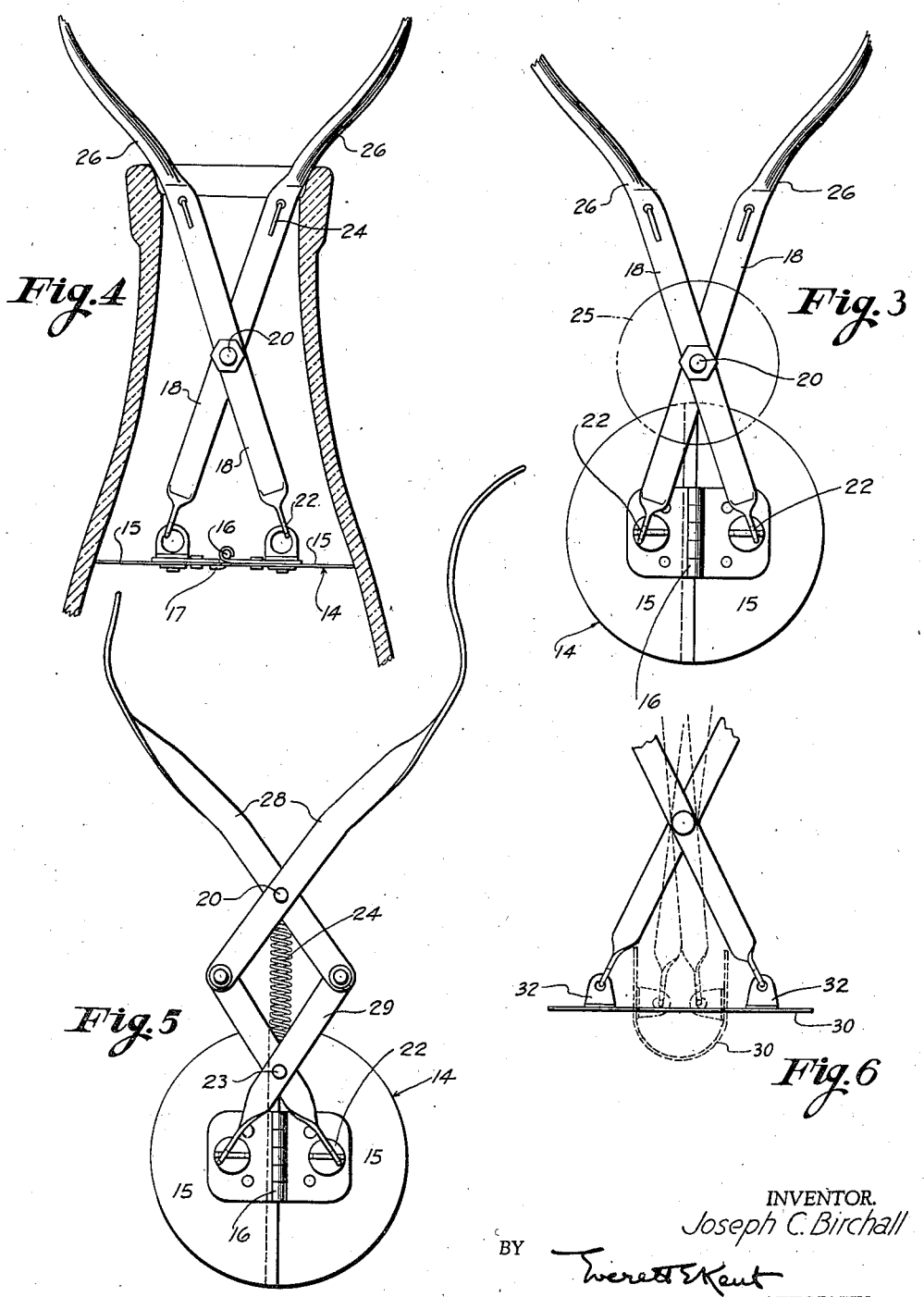
INVENTOR.
Joseph C. Birchall
BY Everett E. Kent
ATTORNEY.

April 7, 1942.  J. C. BIRCHALL  2,279,273
SEPERATOR FOR BOTTLED MILK AND CREAM
Filed April 8, 1939  3 Sheets-Sheet 3
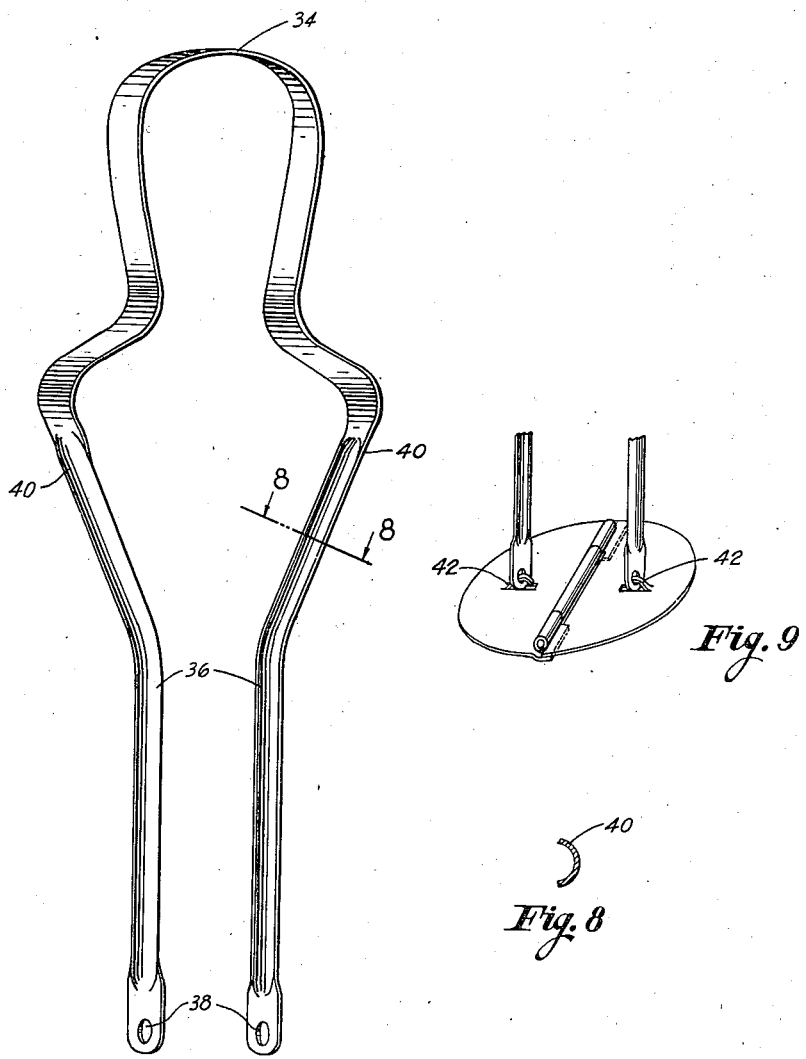
INVENTOR.
Joseph C. Birchall
BY Everett E Kent
ATTORNEY.

Patented Apr. 7, 1942

2,279,273

UNITED STATES PATENT OFFICE 2,279,273

SEPARATOR FOR BOTTLED MILK AND CREAM

Joseph C. Birchall, Reading, Mass., assignor, by direct and mesne assignments, of thirty-seven and one-half per cent to Frederick H. McAdams, Revere; twenty-nine and one-sixth per cent to John B. Neal, Allston; and thirty-three and one-third per cent to Everett E. Kent, Newton, Mass., as trustees Application April 8, 1939, Serial No. 266,888

2 Claims. (Cl. 210—51.5)

This invention relates to improvements in separators for bottled milk and cream.

More especially it relates to separators for domestic use in holding back milk, while pouring cream which has risen from it in a bottle of the sort customarily used for home deliveries and for sales by retail stores.

It is an object of the invention to provide a partition which may be set into a bottle and be seated there about at the plane of division between milk and cream in the bottle. It is a feature that the partition can coact with an interior ledge seat, if there be such suitably placed on the bottle walls, or can seat itself on the sloping, smooth surfaced walls as found in milk bottles of conventional style.

One object is to provide means whereby the separator can be manipulated conveniently into and out from the bottle; another is to provide so that, when released, the partition will automatically become seated, and will hold itself as a separator in the region of the cream line. Incidentally the separator is propelled and guided during its said automatic seating.

There are moreover, the important features that my improved separator may be produced at a cost which will be commercially acceptable, and when in domestic use is adapted to be easily and thoroughly cleaned.

The mentioned objects and results may be obtained by employing a collapsible disk, and mounting the disk on a pair of pivotally connected crossing levers. Preferably the semi-circular halves of the disk are leaves hinged together on the diameter which they have in common, each lever having connection to the disk, one on one side and the other on the other side of that hinge diameter, by loose attachment to little posts or links upstanding above the plane of the leaves and their hinge.

If each attaching device is a pair of interengaged loops, this makes a universal point, for collapse and tipping of the partition, with provision for moderate automatic accommodation to variations in dimensions of different bottles. Preferably the levers will pivotally cross each other nearer to their disk ends than to their handle ends, whereby said handle ends will have a greater spread, sufficient for engaging the rim of the bottle mouth so that, when spread, they prevent the seated separator from leaving its seat and moving further inward of the bottle; and so that, as they spread toward that position, they slip over the bottle rim which acts as a sort of cam to draw the whole body outward of the bottle, until outward travel is arrested by the seating of the partition on the bottle wall or ledge. During such a spreading the disk ends of the levers are also spreading, thus opening the folded leaves of the disk till they constitute a plane plate which the said cam action draws firmly against the said seat. Preferably this spreading of the handles is effected by a spring whenever the person using the device releases the handles. A squeezing of the handles together, as in a scissors action, causes folding of the disk, for insertion and removal of the separator. The levers have suitable inclination or curvature for the said cam-riding on the bottle rim as the disk is becoming automatically seated, under the urge of the spring, when the levers are released. The disk may be of light stiff metal or other plate material; or may be made integral of flexible elastic plate material, in which case the collapsing is effected by bending it, this being a substitute for the hinge.

In either case there may be suitable provision to assure that each initial collapsing movement of the plate is an up-folding of edges. In the particular construction illustrated, the offsetting of both joints to the same side of the plate does this. If they were in the plane of the plate, other means might be employed.

If the bottle dimensions are such that a single pair of crossed levers does not conveniently accommodate all of the functions herein ascribed to the levers—as to spread of handles, cam action on bottle rim, stops for inthrust, and for holding partition seated—greater depth of penetration may be combined with desired spread and cam action of handles by introducing another pair of crossed levers into the connection between the first pair and the plate, and by bending the handle arms to suitable spread and curvature.

In the accompanying drawings:

Figure 3 is a broadside fragmentary back view of the separator of Figures 1 and 2 showing the device as when at rest, not in use, with the disk flattened against the levers, and showing an accessory guide which may be added;

Figure 4 is a view similar to Figure 1, but from the back side, showing the separator seated on the smooth sloping walls of a conventional milk bottle;

Figure 5 is an elevation of a modified form of a separator, showing the disk flattened against the levers;

Figure 6 is a view corresponding to a part of Figure 1, in which a flexible integral disk is substituted for the hinged stiff leaves of Figure 1;

Figure 7 is a perspective of a one-piece spring-metal form of handle for manipulating a separator disk;

Figure 8 is a plan in section on 8—8 of Figure 7; and

Figure 9 is a perspective of a modified form of separator disk.

Figures 1, 2:
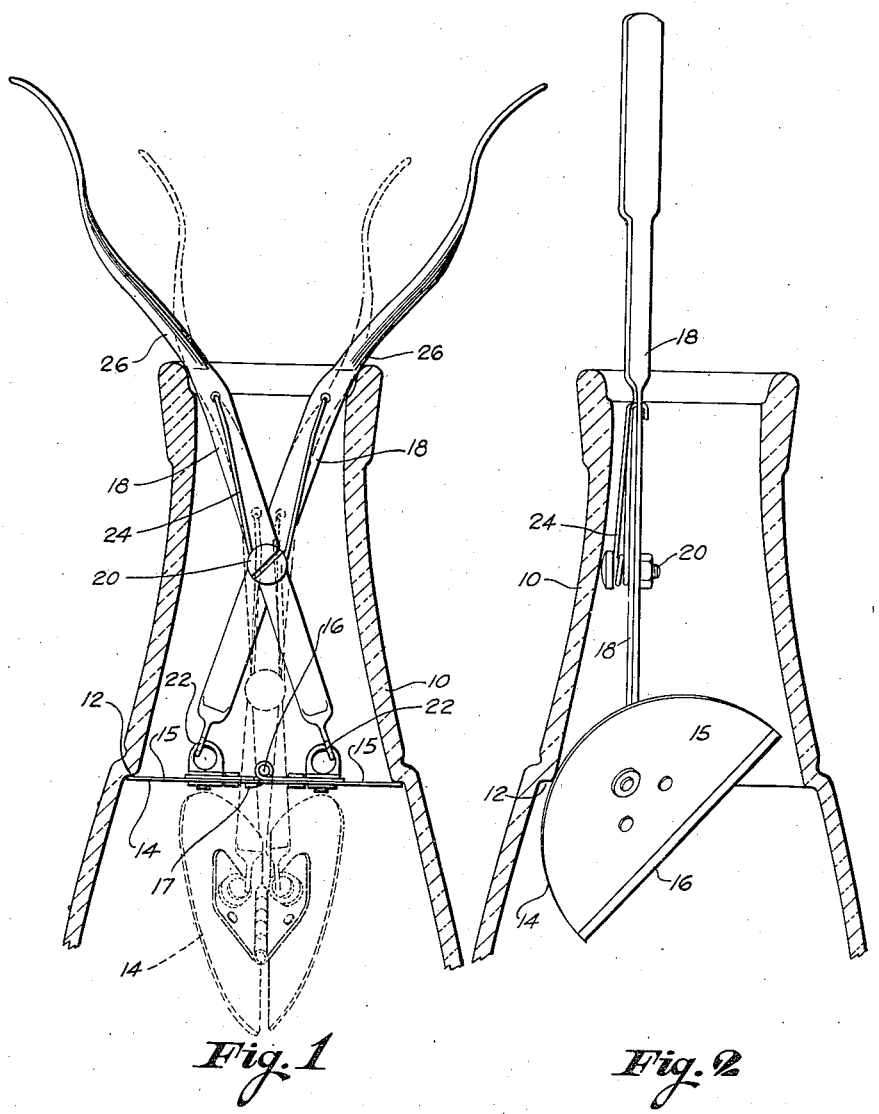
Figure 1 is an elevation, in medial vertical section through a milk bottle, showing broadside, in full lines, a separator embodying features of the invention, seated therein; and showing, in dotted lines, the same separator in collapsed state and in the position which it occupies, before and after its being seated, for insertion and for removal.
Figure 2 is a similar view, edgewise, looking from the right in Figure 1, and showing the disk collapsed and in the midst of its travel for insertion or removal.

Referring to the drawings, the milk bottle 10 may be of an ordinary style, with or without an interior annular ledge seat 12 as shown in Figures 1 and 2. Figure 4 shows the conventional milk bottle with smooth, gradually sloping walls.

The separator disk partition 14 may be of any suitable material, for example, of metal, or of synthetic plastic material, or of rubber, and may be made in semi-circular sections constituting leaves 15, 15, hinged together at 16. Or a thin flexible and resilient disk of metal or other material, in one piece (Figure 6), may be made which will permit needed flexing, its curvature serving the function of a hinge, for its insertion in and removable from the bottle. If the partition is flexible, it should nevertheless be at least stiff enough to hold in the bottle-contents of milk, when the bottle is inverted for the pouring off of the cream; and if stiff leaves are hinged together, there may be stops, as at 17, to prevent their bending outward past the plane position.

In the particular embodiments of the invention here shown, which are illustrative of various ways in which it may be constructed, but are not to be taken as definitive of the limits of the invention, the partition plate 14 is a disk, because the bottle is round, and in Figures 1, 5 is shown as of a hinged variety, mounted on a pair of stems, levers 18, 18, which cross each other at a pivotal fulcrum 20, much like a pair of scissors. Each section 15 of the disk has a universal joint connection at 22 to the end of the shorter arm of one lever 18; and in this joint there may preferably be considerable looseness in the direction of spread of the levers. Because of the offsetting of these connections from the plane of the disk and its hinge, a mutual approach of the lever ends at 22, consequent upon a squeezing together of the longer arms of the levers, causes a bending of the plate at the hinge 16. While the levers might be spread by hand, the invention provides a spring 24 which yieldingly urges the lever arms apart, tending at the end 22 to establish and maintain flatness of the plate 15, and tending at the handle end to spread those arms of the lever rather strongly against the bottle rim.

Thus, by squeezing the levers together, the disk may be collapsed so that it can be passed through the neck of bottle 10. The levers are long enough to permit insertion of the disk to a location somewhat below whatever shall have been predetermined as being approximately the cream line in the size and shape of bottle, and quality of milk, with which the device is to be used. The outer arms of the levers may be smooth and inclined obliquely from the axis of the bottle outward as at 26 for engaging the bottle walls at the rim, to constitute cam rails and beyond this obliquity they may have any form which is convenient for finger grasp by the person using the device. The curvature, spread and length of these oblique parts of the arms should have a relation to the size and shape of the bottle, and distance of the seat 12 from the rim, such that when the disk is fully spread it is also drawn tight against the seat by the cam effect of the spring-spread oblique rails in the outer arms. In spreading, the rails will seek a diameter of the bottle-mouth, and so the rails can centre the whole on a mid-plane of the bottle. Also their excess of spread, when squeezed together to their limit for collapsing the plate, can limit the travel of the levers inward axially of the bottle. The limit in this respect is with the disk at a position whence its outward and upward travel toward its seat, when the spring 24 automatically spreads the levers and flattens the disk, will be amply clear of engaging the walls or seat before the disk is sufficiently spread to become well seated. In this spreading and seating action the oblique outer arms of the levers slide outward over the bottle rim, as from the dotted line to the full line position of Figure 1. Thus they propel and guide the spreading and travel of the immersed disk, as it invisibly moves through the liquid to seating engagement with the bottle walls. The liquid cooperates with the rails in moderating and restraining the violence of travel which a stiff spring might otherwise induce.

If the bottle is one having a ledge seat interiorly, as in Figures 1 and 2, the action of spring 24 thus draws the disk toward seating engagement therewith. If the person using the device happens not to have positioned it centrally, the bottle walls just below that ledge will guide the disk to a proper seating. Or, if the bottle happens to be one whose interior walls have the smooth sloping extent which is conventional for milk bottles, as in Figure 4, the spreading arms draw the disk toward its plane status, and draw its edge toward annular contact against the sloping walls, the disk and bottle being of suitable relative size and shape for the engagement to occur at or near the cream line. When the disk is seated it acts as a partition; the action being comparable to the introducing and closing of a valve. If desired, a disk 25 (Figure 3) may be mounted at the pivot 20 of the levers, to serve as a centering guide when the levers are moving into or out from the bottle.

In the modified form of Figure 5 the connection of the main crossed levers 28, 20 to the disk 14 is through a lazy tongs 29 pivoted together at 23, and having end connections 22 to opposite sections 15 of the disk. A tensile coil spring 24' between the two pivots 20 and 23 tends to spread both pairs of levers, with the result of spreading and seating the plate. By this means a plate can be inserted to a low depth through a relatively small bottle neck, and yet the outer arms 28 be of sufficient obliquity to slide under spring propulsion for seating the plate. This device of Figure 5 also illustrates how strips of metal may be twisted so that different portions of an originally flat strip provide the handles, the cam surfaces for sliding on the bottle rim, and the places for attachment to other levers, or to the disk sections. Their terminals at 22, seen only edgewise in the drawing, may be loops like those loops in which they are engaged.

For inserting the device into a bottle standing on a table the fingers of one hand squeeze the levers. This collapses the disk, which one then inserts until the handle end stops against the bottle rim, and then lets go. The spring immediately seats the plate as a partition, and holds it there while the bottle is inverted for pouring whatever contents are above the plate. To remove the device from the bottle one squeezes the handles and presses the thus collapsed disk a little further inward and against the wall of the bottle, as in Figure 2, which tips the hinge diameter of the disk so that it is oblique to the axis of the bottle neck and can easily be withdrawn, with the curved edge of the collapsed disk sliding along the interior surface of the bottle's neck.

In Figure 6 an integral, thin flexible disk 30 is represented. This may be of suitable metal with posts for attachment to the operating levers, stamped and bent or attached, for example like those in Figure 1; or, as illustrated, the disk may be of a suitable molded composition and may have the posts 32 molded as integral parts of the disk.

The device for manipulating the collapsible disk does not need to be pivotally connected levers. Figure 7 illustrates a single piece, bent metal device, in the nature of a sugar tongs, which may have a collapsible disk mounted at its ends. This might be a suitably stiff and resilient bent piece of wire, in which case the ends would be looped, or flattened and punched, for pivotal connection to the disk. As illustrated, a flat piece of spring metal is employed, with the curved bend 34 constituting a spring which tends to spread the ends of the arms 36 apart. Preferably these arms 36 are stiffened by having a curved cross section. The ends are left flat and a hole 38 is punched in each for connection to the disk. The upper portions 40 of the arms may be suitably shaped for riding on the bottle rim during seating of the disk, as described in connection with the crossed-lever forms.

Also the disk may comprise two sections which themselves embody coacting hinge parts, as shown in Figure 8, which shows in addition a punching out of the disk stock at 42 to provide loops for connection to the levers or other operating devices.

It is intended that the patent shall cover, by suitable expression in the appended claims, whatever features of patentable novelty exist in the invention disclosed.

I claim as my invention:

1. A device for separating cream from milk in a bottle having predetermined interior diameters at its mouth and approximately at the plane between the milk and the cream, comprising a flexible disk of the same diameter as that of the interior of the bottle at said plane, two arms above the disk, loosely attached thereto at diametrically opposite points, between the edge of the disk and the center of the disk, and extending upwardly from the disk to a region approximately midway between the two predetermined diameters, then gradually outwardly away from each other to a position on those arms which is external to the bottle when the disk is in separating position, means for connecting said arms and for urging the lower end of one arm away from the lower end of the other arm so that the said outwardly extending portions thereof will bear upon the bottle mouth and hold said disk in separating position, the means for attaching the arms to the disk being so constructed that the disk may turn about an axis through the points of attachment when being inserted into the bottle.

2. A device for separating cream and milk in a bottle having predetermined diameters at its mouth and approximately at the plane between the cream and the milk, comprising a flexible disk of the same diameter as that of the interior of the bottle at said plane, two arms above the disk, loosely attached thereto at diametrically opposite points, between the edge of the disk and the center of the disk, extending upwardly from the disk to a position on those arms which is external to the bottle when the disk is in separating position, said arms crossing and being pivotally attached to each other at a point approximately midway between the two said predetermined diameters and thence sloping upward and apart, means for urging one arm away from the other so that the sloping portions of said arms above the pivotal attachment will bear upon the bottle mouth and hold said disk in separating position, the means for attaching the arms to the disk being so constructed that the disk may turn about an axis through the points of attachment when being inserted into the bottle.

JOSEPH C. BIRCHALL.